Nov. 18, 1952  K. M. BROWN ET AL  2,618,470
GAS TURBINE-DRIVEN AUXILIARY POWER
AND AIR CONDITIONING SYSTEM
Filed Aug. 19, 1946
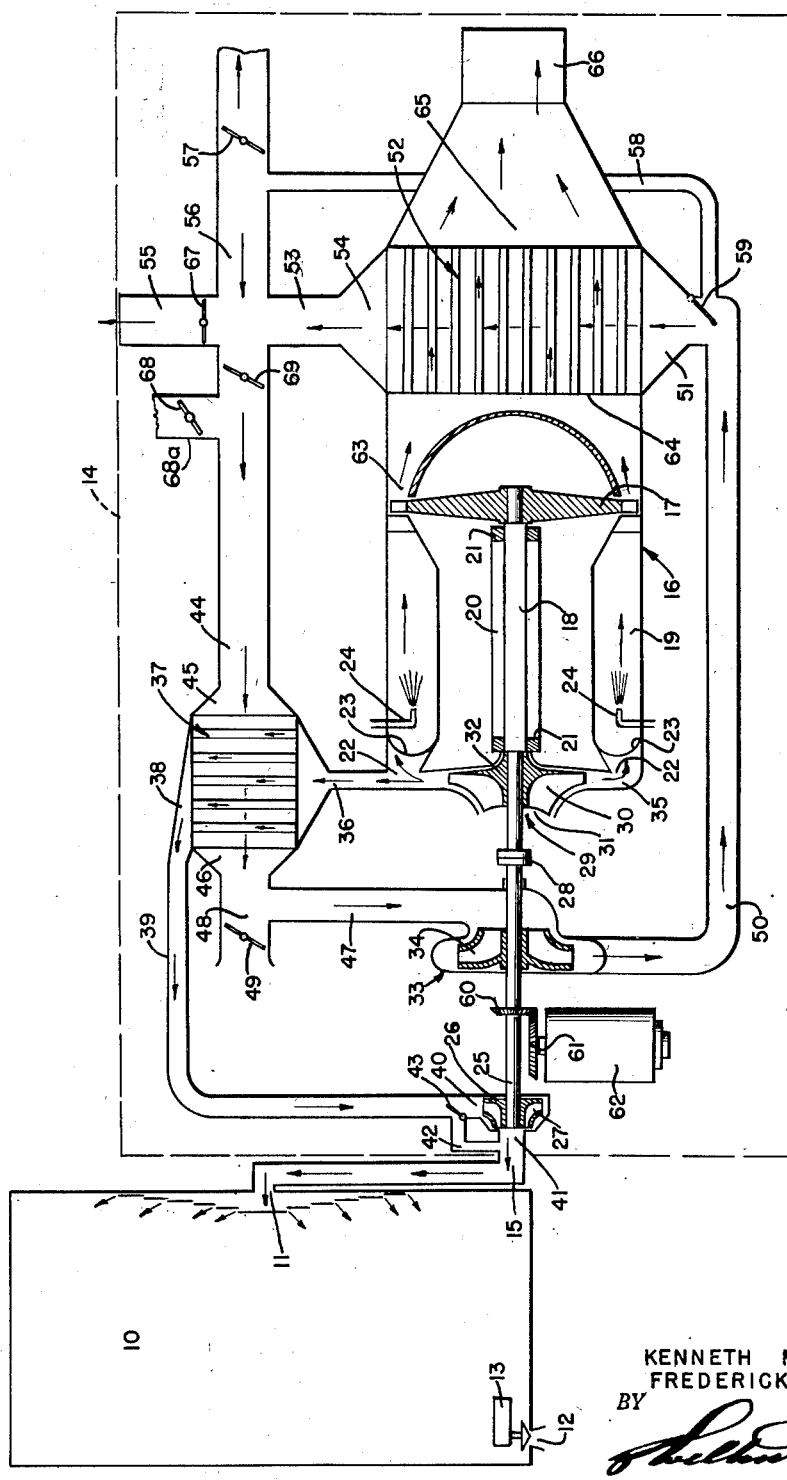
INVENTORS
KENNETH M. BROWN
FREDERICK H. GREEN
BY
ATTORNEY Patented Nov. 18, 1952

2,618,470

UNITED STATES PATENT OFFICE 2,618,470

GAS TURBINE-DRIVEN AUXILIARY POWER AND AIR CONDITIONING SYSTEM

Kenneth M. Brown, Culver City, and Frederick H. Green, Los Angeles, Calif., assignors to The Garrett Corporation, Los Angeles, Calif., a corporation of California Application August 19, 1946, Serial No. 691,454

9 Claims. (Cl. 257—9)

Our invention relates to the air conditioning of enclosures or chambers, and relates in particular to a device especially useful for supplying air to cabins or compartments of aircraft.

It is an object of the invention to provide a gas turbine-driven air conditioning system arranged for the delivery of power for uses other than air conditioning.

An object of the invention is to provide a device of the character described in the preceding paragraph which is simplified as the result of the novel arrangement and interconnection of its operating parts.

A further object of the invention is to accomplish a reduction in weight of air conditioning units having self-contained power sources.

A further object of the invention is to provide an air conditioning unit employing a combustion turbine and an air turbine arranged to drive a single transmission means to which air pumping devices are connected and which may be employed to transmit the power to other power utilizing devices, such as an electric generator or a generator and alternator unit.

A further object of the invention is to provide a turbine-driven unit of the character set forth herein, having a novel arrangement of ducts whereby control of the temperature of the conditioned air may be conveniently and efficiently attained, and whereby heated air for other utilization in the aircraft may be obtained, such, for example, as heated air for supplying the anti-icing ducts associated with external walls of the aircraft.

Further objects and advantages of the invention may be brought out in the following part of the specification.

Referring to the drawing, which schematically shows a preferred embodiment of our invention, connected to a chamber, identified as an aircraft cabin 10, an air inlet 11 for the cabin 10 is shown. Cabin 10 is provided with an air outlet 12 controlled by the cabin pressure regulator 13, which may be of any type known to the art. The invention comprises a compact unit 14 having an outlet 15 connected to the cabin inlet 11 for delivery into the cabin 10 of conditioned air at the pressure required by existing pressure requirements of the cabin 10.

The unit 14 includes a combustion turbine 16 having an axial flow rotor 17 fixed on the rightward end of a shaft 18 which constitutes the power transmission means of the turbine. In the embodiment of the invention shown in the drawing the combustion chamber 19 of the turbine 16 surrounds the bearing case 20 which has bearings 21 to support the shaft 18 for high velocity rotation. At the leftward end of the combustion chamber 19, the combustion turbine 16 has an annular air inlet 22 embracing air inlet openings 23 operatively aligned with fuel nozzles 24 which are disposed at the leftward end of the combustion chamber 19 and are fed with fluid fuel in accordance with the power requirements of the turbine 16.

The shaft 18 of the combustion turbine 16 cooperates with a shaft 25 which forms a transmission means for receiving the power developed by an air turbine 26 having a rotor 27 mounted on the shaft 25. The shaft 25 may be in axial alignment with the shaft 18 and connected thereto by means of a coupling 28 as shown in the drawing, or may be offset therefrom and connected by gear means. The transmission means 18 and 25 of the invention are arranged to drive air pumping means 29 arranged to move flows of air through selected paths. The pumping means 29 includes a blower or compressor 33 and an air compressor 30 having an air inlet 31 for connection to a source of atmospheric air, such as a ram air intake on the aircraft. The impeller 32 of the compressor 30 is fixed on the shaft 18 so that it will be driven by the rotor 17 of the turbine 16. The blower or compressor 33 has an impeller 34 fixed on the shaft portion 25 of the transmission means.

The annular outlet chamber 35 of the compressor 30 communicates with the annular air inlet 22 of the combustion chamber 19 and with the inlet 36 of one pass of a heat exchanger 37. The outlet 38 of this exchanger 37 is connected through a duct 39 with the inlet 40 of the air cooling turbine 26. The outlet 41 of the air turbine 26 is directly connected to the air outlet 15 of the unit 14 so that air which passes from the compressor 30 through the first pass of the heat exchanger 37 may be delivered through the turbine 26 and the air inlet 11 into the cabin 10. An air bypass 42 connects the air duct 39 with the outlet 41 of the turbine, this bypass 42 having a valve 43 which may be opened so as to permit air to bypass from the duct 39 around the turbine 26 to the cabin.

A coolant air inlet duct 68a provided with a valve 68 is connected through a duct 44 with the inlet 45 of the other or second pass of the heat exchanger 37. The outlet 46 of the second pass is connected through an air duct 47 with the inlet of the blower 33. In the duct 47 there is a valved port 48 communicating with the outer atmosphere. The valve 49 associated with this port 48 may be adjusted during the different operations of the unit to permit air to escape from or enter the duct 47. The outlet of the blower 33 is connected with a duct 50 which carries air from the blower 33 to the inlet 51 of the first pass of a heat exchanger 52. A duct 53 connects the outlet 54 of the first pass of this heat exchanger 52 with the duct 44, with a valved passage 55 leading to the atmosphere, and with a duct 56 for delivering hot air to various parts of the aircraft as may be required. The annular exhaust outlet 63 of the turbine 16 is connected to the inlet 64 of the second pass of the heat exchanger 52, the outlet 65 of this second pass being connected to an exhaust passage 66 through which the exhaust products from the turbine 16 are finally delivered to the atmosphere.

The duct 56 is ordinarily referred to as the anti-icing duct, and communicates with heating chambers associated with selected external walls of the aircraft. A valve 57 in this duct 56 controls the flow of warm air therethrough. In order to modulate the temperature of the air passing through the anti-icing duct 56, a bypass duct 58 connects the duct 50 with the duct 56 and a valve 59 is provided for the duct 58 to control the flow of relatively cool air through the duct 58 to be mixed with the hot air in the duct 56.

The shaft part 25 of the transmission means has thereon a bevel pinion 60 for driving a bevel gear 61 connected to the drive shaft of a generator and alternator unit 62 constituting a source of supply of direct and alternating electric current for use in the aircraft.

The heat exchanger 37 serves as a means for cooling or heating the air which is delivered to the duct 39, and this heat exchanger 37 at times serves also as a part of the system for recovering some power from the heat of the exhaust gases of the turbine 16. For example, in one use of the apparatus, hot air from the heat exchanger 52 is passed through the duct 44 to the second pass of the heat exchanger 37 so as to impart heat to the air which is flowing to the duct 39. From the duct 39 the heated air is delivered to the inlet 40 of the cooling turbine 26 which is thereby driven and absorbs power and heat from the air before it is delivered from the turbine 26 into the cabin 10. The power recovered by the turbine 26 is delivered to the transmission means consisting of the shafts 18 and 25, and assists in the driving of the air pumping means 29.

If operating conditions require delivery of low temperature air through the duct 39, a valve 69 in the duct 44 between the ducts 68a and 53 is fully closed and the air inlet valve 68 is partly or fully opened, as conditions may require, so that coolant air will pass into the duct 44 and through the second pass of the heat exchanger 37. At this time, the valve 67 in the outlet duct 55 may be opened to the required extent so that heated air from the duct 53 will pass off into the atmosphere.

One of the features of the invention is that the coolant air from the inlet valve 68 is moved through the second pass of the heat exchanger 37 by suction of the blower 33 when the valve 68 is partially or fully opened and the valve 69 fully closed, thereby giving an efficient cooling effect in the heat exchanger 37, with the result of efficiently cooling the air which is passing through the heat exchanger 37 to the duct 39. A further feature of the invention resides in the provision of an arrangement of ducts 44, 47, 50, and 53 defining a continuous loop passage including and in series with the second pass of the heat exchanger 37 and the first pass of the heat exchanger 52, whereby the blower or compressor 33 may act to circulate air heated by the heat of compression of the compressor 33 and by the turbine exhaust gases in the heat exchanger 52, through this continuous circuit for transfer of heat to the heat exchanger 37, thereby quickly raising the temperature of the air in the circuit to a higher temperature than could be obtained in a system that bleeds atmospheric air into the ducts, during those times when heating of the air to be delivered to the cabin 10 is necessary. An additional feature is the provision of the valve 49 whereby additional air may be admitted to the duct 47 when air received from the outlet 46 of the heat exchanger 37 is insufficient for the needs of the system. For example, during the flight of the aircraft in cold weather, it may be necessary to partly or fully close the air inlet valve 68, and partly or fully close the valve 69, to deliver a desired quantity of hot air from the duct 53 to the anti-icing duct 56. At this time, the valve 49 may be opened to compensate for the air which is delivered from the air circulating system into the duct 56 for anti-icing purposes.

The utility of the bypass 42 associated with the air turbine 26 is twofold. First, when the airplane is flying at high altitude, the air being pumped is less dense and the weight flow of air passing through the air turbine 26 may not be sufficient to meet the requirements for the cabin. To supply the desired weight flow of air for the cabin, the valve 43 may be opened to the extent required to allow additional air to flow in through the bypass 42. Secondly, when air at relatively high temperature is required in the cabin 10, the valve 43 may be opened to the required extent so that air may pass through the bypass 42 from the duct 39 without being cooled by the action of the turbine 26.

We claim:

1. In a turbine powered system of the character described for air conditioning a chamber, the combination of: a combustion turbine; an air cooling turbine; first and second air moving means each driven by at least one of said turbines; a heat exchanger; duct means arranged to carry air from the first of said air moving means through one pass of said heat exchanger and selectively through said air turbine to said chamber and directly to said chamber; duct means connecting the inlet of the second of said air moving means to the outlet of the other pass of said heat exchanger to draw air therethrough; a second heat exchanger having one pass thereof connected to the discharge of said combustion turbine; and duct means adapted to be connected to the outlet of one of said air moving means and being arranged to conduct a flow of air through the other passes of said heat exchangers in series, so that the air flowing toward the chamber may be heated.

2. In a turbine powered system of the character described for air conditioning a chamber, the combination of: a combustion turbine; an air cooling turbine; first and second air moving means each driven by at least one of said turbines; a first heat exchanger; means for conducting air from one of said air moving means to the combustion chamber inlet of said combustion turbine; duct means arranged to carry air from the first of said air moving means through one pass of said heat exchanger and through said air turbine to said chamber; an air duct adapted to communicate with a source of coolant air; duct means connecting the other pass of said heat exchanger with the second of said air moving means and said air duct so as to produce a flow of air through said other pass of said heat exchanger by suction; a second heat exchanger; and duct means arranged to connect said second heat exchanger in series with the outlet of one of said air moving means and the inlet of the other pass of said first heat exchanger.

3. In a turbine powered system of the character described for air conditioning a chamber, the combination of: a combustion turbine; an air cooling turbine; transmission means extending from said combustion turbine; transmission means extending from said air turbine; first and second air moving means each driven by at least one of said transmission means; a heat exchanger; duct means arranged to carry air from the first of said air moving means through one pass of said heat exchanger and through said air turbine to said chamber; a second heat exchanger having one pass thereof connected to the discharge of said combustion turbine; and duct means formed so as to provide a substantially continuous loop passage including the second of said air moving means and the remaining passes of said heat exchangers, whereby heat generated by the second of said air moving means and heat from said combustion turbine may be imparted to the air flowing toward said chamber.

4. In a turbine powered system of the character described for air conditioning a chamber, the combination of: a combustion turbine; an air cooling turbine; transmission means extending from said combustion turbine; transmission means extending from said air turbine; first and second air moving means each driven by at least one of said transmission means; a heat exchanger; duct means arranged to carry air from the first of said air moving means through one pass of said heat exchanger and through said air turbine to said chamber; duct means connecting the other pass of said heat exchanger with the inlet of the second of said air moving means whereby said air moving means will produce a flow of air through said other pass of said heat exchanger by suction; a second heat exchanger having one pass thereof connected to the discharge of said combustion turbine; duct means arranged to conduct air from one of said air moving means through the other pass of said second heat exchanger; and valved duct means for selectively connecting the outlet of said other pass of said second heat exchanger to the inlet of said other pass of said first named heat exchanger and to ambient atmosphere whereby heat from said combustion turbine may be transmitted to the air which is flowing toward said chamber or may be otherwise disposed of.

5. In a turbine powered system of the character described for air conditioning a chamber, the combination of: a combustion turbine; an air cooling turbine; transmission means extending from said combustion turbine; transmission means extending from said air turbine; first and second air moving means driven by at least one of said transmission means; a heat exchanger; duct means arranged to carry air from the first of said air moving means through one pass of said heat exchanger and through said air turbine to said chamber; duct means to connect the other pass of said heat exchanger with the second of said air moving means whereby the second of said air moving means will produce a flow of air through said other pass of said heat exchanger by suction; a second heat exchanger having one pass thereof connected to the discharge of said combustion turbine; duct means arranged to conduct air from one of said air moving means through the other pass of said second heat exchanger; and means for connecting the outlet of said other pass of said second heat exchanger to the inlet of said other pass of said first named heat exchanger, and for connecting the inlet of said other pass of said first named heat exchanger to atmosphere and said outlet of said other pass of said second heat exchanger to atmosphere.

6. In an air cooling and heating system: a combustion turbine; air pumping means driven by said turbine; a first heat exchanger; means for moving air through one pass of said heat exchanger to a chamber; a second heat exchanger having one pass thereof connected to the discharge of said turbine; duct means connecting the outlet of the other pass of said first heat exchanger with the inlet of said air pumping means; means connecting the outlet of said air pumping means with the inlet of the other pass of said second heat exchanger; and valved duct means for selectively connecting the outlet of said other pass of said second heat exchanger with the inlet of said other pass of said first heat exchanger and to ambient atmosphere independently of said first heat exchangers.

7. In an air cooling and heating system: a combustion turbine; air pumping means driven by said turbine; a first heat exchanger; means for moving air through one pass of said heat exchanger to a chamber; a second heat exchanger having one pass thereof connected to the discharge of said turbine; duct means connecting the outlet of the other pass of said first heat exchanger with the inlet of said air pumping means; a second air moving means; means connecting the outlet of said second air moving means with the inlet of one of the passes of said second heat exchanger; duct means for selectively connecting the outlet of said other pass of said second heat exchanger with the inlet of said other pass of said first heat exchanger and with ambient atmosphere independently of said first heat exchanger; and means for selectively connecting the inlet of said other pass of said first heat exchanger with ambient atmosphere and the outlet of said other pass of said second heat exchanger with ambient atmosphere independently of said first heat exchanger.

8. In a turbine powered system of the character described for air conditioning a chamber, the combination of; a combustion turbine; an air cooling turbine; air moving means driven by at least one of said turbines; a heat exchanger; duct means arranged to carry air from said air moving means through one pass of said heat exchanger and selectively through said air turbine to said chamber and directly to said chamber; a heater connected so as to receive hot products of combustion from said combustion turbine, said heater having air heating passages; a coolant air duct; and duct means adapted to convey air selectively through said air heating passages into said coolant air duct to said other pass of said heat exchanger whereby the system is selectively operable to cool and heat said chamber.

9. In a turbine powered system of the character described for air conditioning a chamber, the combination of: a combustion turbine; an air turbine; transmission means driven by the impellers of said turbines; first and second air moving means each driven by said transmission means; a heat exchanger; means for conducting air from one of said air moving means to the combustion chamber inlet of said combustion turbine; duct means arranged to carry air from the first of said air moving means through one pass of said heat exchanger and through said air turbine to said chamber; a second heat exchanger having one pass thereof connected to the discharge of said combustion turbine; and valved duct means connected to the second of said air moving means and being arranged to selectively conduct a flow of air through the other pass of said second heat exchanger and then through the other pass of said first heat exchanger so as to heat the air moving toward said chamber.

KENNETH M. BROWN.
FREDERICK H. GREEN.

REFERENCES CITED

The following references are of record in the file of this patent:

UNITED STATES PATENTS

| Number | Name | Date |
| --- | --- | --- |
| 2,370,035 | Heymann | Feb. 20, 1945 |
| 2,391,838 | Kleinhans | Dec. 25, 1945 |
| 2,409,159 | Singleton | Oct. 8, 1946 |
| 2,412,110 | Williams, Jr. | Dec. 3, 1946 |
| 2,471,123 | Rouy | May 24, 1949 |
| 2,491,461 | Wood | Dec. 13, 1949 |